(12) United States Patent
Thornton et al.

(10) Patent No.: US 6,385,666 B1
(45) Date of Patent: *May 7, 2002

(54) COMPUTER SYSTEM HAVING REMOTELY LOCATED I/O DEVICES WHERE SIGNALS ARE ENCODED AT THE COMPUTER SYSTEM THROUGH TWO ENCODERS AND DECODED AT I/O DEVICES THROUGH TWO DECODERS

(75) Inventors: Barry Thornton; Andrew Heller; Daniel Barrett, all of Austin; Charles Ely, Horseshoe Bay, all of TX (US)

(73) Assignee: Clearcube Technology, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,812

(22) Filed: Mar. 14, 2000

Related U.S. Application Data (63) Continuation of application No. 09/072,320, filed on May 4, 1998, now Pat. No. 6,038,616.
(60) Provisional application No. 60/069,464, filed on Dec. 15, 1997.

(51) Int. Cl.[7] ............................ G06F 13/14; G06F 3/00; G06F 15/78
(52) U.S. Cl. ............................ 710/2; 710/106; 710/129; 375/219
(58) Field of Search ........................ 710/2, 101, 106, 710/129, 104; 348/465; 709/227, 228, 244; 375/219, 220, 295

(56) References Cited

U.S. PATENT DOCUMENTS

| | | | |
|---|---|---|---|
| 3,725,866 A | | 4/1973 | Oldfield et al. |
| 4,484,306 A | | 11/1984 | Kulczyckyj et al. |
| 4,688,246 A | * | 8/1987 | Eilers et al. .................... 380/9 |
| 5,150,243 A | | 9/1992 | Suzuki |

(List continued on next page.)

Primary Examiner—Thomas Lee
Assistant Examiner—Thuan Du
(74) Attorney, Agent, or Firm—Conley, Rose & Tayon PC (57) ABSTRACT

A system comprise a computing system and a human interface located remotely from the computing system. The human interface may comprise a display device and an input/output ("I/O") device. The system may include a first interface device coupled to the computing system and a second interface device coupled to the display device and the I/O device of the human interface. The system may also include at least one transmission line coupling the first and second interface devices. The first interface device is operable to receive, from the computing system, a video signal to be transmitted to the display device and a non-video signal to be transmitted to the I/O device, and is operable to convert each of the video signal and the non-video signal into a format suitable for transmission to the second interface device. The converted video signal and the converted non-video signal may then be transmitted to the second interface device via the at least one transmission line. The second interface device is operable to receive the converted video signal and the converted non-video signal from the first interface device and to provide the video signal and the non-video signal to the display device and the I/O device, respectively.

17 Claims, 4 Drawing Sheets

U.S. PATENT DOCUMENTS

| | | |
|---|---|---|
| 5,257,390 A | 10/1993 | Asprey |
| 5,268,676 A | 12/1993 | Asprey et al. |
| 5,337,413 A | 8/1994 | Lui et al. |
| 5,347,167 A | 9/1994 | Singh |
| 5,353,409 A | 10/1994 | Asprey et al. |
| 5,428,806 A | 6/1995 | Pocrass |
| 5,479,617 A | 12/1995 | Nci |
| 5,499,377 A | 3/1996 | Lee |
| 5,550,593 A * | 8/1996 | Nakabayashi ............... 348/465 |
| 5,577,205 A | 11/1996 | Hwang et al. |
| 5,598,401 A | 1/1997 | Blackwell et al. |
| 5,623,304 A * | 4/1997 | Ota et al. ................... 348/143 |
| 5,675,811 A | 10/1997 | Broedner et al. |
| 5,715,410 A | 2/1998 | Kim |
| 5,721,842 A | 2/1998 | Beasley et al. |
| 5,734,834 A | 3/1998 | Yoneyama |
| 5,801,689 A | 9/1998 | Huntsman |
| 5,802,281 A * | 9/1998 | Clapp et al. ................ 709/228 |
| 5,831,608 A | 11/1998 | Janay et al. |
| 5,878,271 A * | 3/1999 | Crump et al. .................. 710/1 |
| 5,884,096 A * | 3/1999 | Beasley et al. ............... 710/38 |
| 5,926,172 A | 7/1999 | Hanley |
| 5,926,509 A | 7/1999 | Stewart et al. |
| 5,948,092 A * | 9/1999 | Crump et al. ............... 710/129 |
| 5,966,056 A | 10/1999 | Thornton |
| 6,006,256 A * | 12/1999 | Zdepski et al. ............. 709/217 |
| 6,012,101 A | 1/2000 | Heller et al. |
| 6,038,616 A | 3/2000 | Thornton et al. |
| 6,078,974 A | 6/2000 | Kirshtein |
| 6,119,146 A | 9/2000 | Heller et al. |
| 6,185,643 B1 | 2/2001 | Kirshtein et al. |

* cited by examiner

COMPUTER SYSTEM HAVING REMOTELY LOCATED I/O DEVICES WHERE SIGNALS ARE ENCODED AT THE COMPUTER SYSTEM THROUGH TWO ENCODERS AND DECODED AT I/O DEVICES THROUGH TWO DECODERS

This application is a continuation of application Ser. No. 09/072,320, filed on May 4, 1998, now U.S. Pat. No. 6,038,616, entitled COMPUTER SYSTEM WITH REMOTELY LOCATED INTERFACE WHERE SIGNALS ARE ENCODED AT THE COMPUTER SYSTEM, TRANSFERRED THROUGH A 4-WIRE CABLE, AND DECODED AT THE INTERFACE, which issued on Mar. 14, 2000, whose inventors are Barry Thorton, Andrew Heller, Daniel Barrett, And Charles Ely, and which claims benefit of U.S. Provisional Application No. 60/069,464, which was filed on Dec. 15, 1997.

This application is related to:

U.S. Pat. No. 6,012,101, titled COMPUTER NETWORK HAVING COMMONLY LOCATED COMPUTING SYSTEMS, which issued on Jan. 4, 2000, whose inventors are Barry Thorton, Andrew Heller, Daniel Barrett, and Charles Ely;

U.S. Pat. application Ser. No. 09/072,382, titled METHOD FOR INCORPORATING BI-DIRECTIONAL COMPUTER DATA INTO A STREAM OF VIDEO INFORMATION AND AN ASSOCIATED COMPUTER SYSTEM HAVING REMOTELY LOCATED I/O DEVICES, which was filed May 4, 1998; and U.S. Pat. No. 6,119,146, titled COMPUTER NETWORK HAVING MULTIPLE REMOTELY LOCATED HUMAN INTERFACES SHARING A COMMON COMPUTING SYSTEM, which issued on Sep. 12, 2000, whose inventors are Barry Thorton, Andrew Heller, Daniel Barrett, and Charles Ely.

TECHNICAL FIELD

The invention relates generally to a computer system comprised of a computing system and a human interface and, more particularly, to a computer system configured such that the human interface thereof is remotely located relative to the computing system.

BACKGROUND OF THE INVENTION

The components of all computer systems, including personal computers (or "PCs"), minicomputers, mainframe computers and mainframes, may be divided into two functional units—the computing system and the human interface to the computing system For a PC, the computing system is, very simply, the chassis which holds the motherboard, power supply, hard drive and the like. The human interface, on the other hand, are those devices that humans used to transfer information to and/or receive information from the computing system. The most commonly recognized devices which form part of the human interface with the computing system include the monitor, keyboard, mouse and printer. Of course, a variety of other devices, for example, a joystick, trackball, touchpad or others too numerous to specifically mention, may form part of the human interface.

Traditionally, the human interface and the computing system have been located in proximity to each other, particularly when the computing system is a PC, desktop or other type of physically compact computer. For example, many workstations now include a computer monitor and mouse resting on the desktop while the chassis holding the computing system rests on the floor underneath the desktop. However, there are a number of concerns raised by placing the computing system and the human interface in such close proximity in the workplace. Many of these concerns relate to security. Business contacts, vendor information, contracts, reports, compilations, proprietary software, access codes, protocols, correspondence, account records, business plans are just some of the fundamental assets of a company which are oftentimes accessible from an employee's computer where it can be quickly copied onto a floppy disk and stolen.

Disk and CD drives may also be used to introduce illegal, inappropriate or dangerous software to a computer. Storing bootlegged software can expose a company to copyright infringement claims. Computer games often reduce employee productivity. If imported onto a computer system, computer pornography may create a hostile work environment which leads to a sexual discrimination lawsuit against the company. Computer viruses can cause the loss of critical information stored on a computer. Finally, the computing system itself may be damaged or otherwise misconfigured when left accessible to technically oriented employees who take it upon themselves to attempt to repair and/or modify the computer system.

Another concern often raised in connection with the present practice of placing the computer system at the desktop is that such workstation designs actual work against proper maintenance of the computing system. When placed underneath the desktop, computing systems are often forced to absorb physical shocks when accidentally kicked, knocked over or struck by falling objects, any of which could result in damage to various electronic components, located within the chassis, which comprises the computing system. Oftentimes, a computing system is placed in a "convenient" location and not in a location designed to keep it cool. A computer system typically includes a cyclonic fan designed to direct a constant flow of cooling area at the heat-generating components of the computing system. However, if a barrier is placed a few inches in front of the fan intake, the efficiency of the fan is reduced dramatically. Similarly, placing the computer system against a wall or running cables in front of the fan adversely affects the ability of the fan to properly cool the computing system. Finally, even in relatively clean office environments, the fan tends to draw in dirt and other dust particles into the interior of the computer chassis where they are deposited on the heat-generating electronic components which comprise the computing system. As dust tends to insulate the components on which it is deposited, the ability of such components to dissipate heat becomes degraded when a layer of dust collects on the component.

Logistical support, too, becomes a vexing problem for computer-intensive organizations when computing systems are scattered throughout a facility. When machine failures occur, the repair person must go to the machine to diagnose and repair the machine. Oftentimes, this entails multiple visits to the machine's location, particularly when the first examination reveals that replacement parts or a replacement machine are needed. Similarly, software upgrades and other performance checks become quite time-consuming tasks when personnel must travel to each machine where the software resides locally.

Finally, many office buildings were designed before the advent of the age of the PC. As a single PC can consume over 300 watts of power, a heavily computerized workplace could potentially demand power in excess of the amount available. Similarly, the heat generated by the large number of computers installed in modern workplaces can easily overwhelm the air conditioning capacity of a building's HVAC system, thereby causing room temperatures to rise above those levels preferred by the occupants of the building.

These and other problems may be solved if the computing systems could be physically separated from the human interfaces, specifically, by keeping the human interfaces (monitor, keyboard, mouse and printer) at respective workstations while relocating the chassis holding the motherboard, power supply, memory, drives, etc. to a secured computer room. By securing the computing systems in one room, the employer's control over the computer systems would be greatly enhanced. For example, since employees would no longer have personal access, through the disk or CD drive, to the memory subsystem, employees could not surreptitiously remove information from the computer system. Nor could the employee independently load software or other data files onto the computer. Similarly, the employee could no longer physically change settings or otherwise modify the hardware portion of the computer. Maintenance would be greatly facilitated by placement of all of the computing systems in a common room. For example, the repair technicians and their equipment could be stationed in the same room with all of the computing systems. Thus, a technician could replace failed components or even swap out the entire unit without making repeated trips to the location of the malfunction machine. Such a room could be provided with special HVAC and power systems to ensure that the room is kept clean, cool and fully powered.

While lengthening the cables which couple the human interface to the computing system may, at first blush, appear to be a solution to this problem, such a solution is not feasible. In order to transfer video signals to the monitor will require 3 coaxial cables while, to transfer the remaining data/control signals between the computing system and the human interface could require as many as ten additional wires. Furthermore, as the distance between the human interface and the computing system is increased, the requisite size of the cables increases. Not only would such a bundle of cables be unwieldy, it would be prohibitively expensive to install, particularly if one wanted to place large numbers of computing systems in the controlled access room.

Therefore, what is needed is a computer configured such that a human interface portion thereof may be remotely located relative to a computing system portion thereof and in which the cabling requirements for remotely locating the human interface are minimal.

SUMMARY OF THE INVENTION

In one embodiment, the present invention of a computer comprised of a computing system positioned at a first location and a human interface positioned at a second location remotely located relative to the first location. A 4-wire cable couples first and second interface devices which, in turn, are respectively coupled to the computing system and the human interface. The first interface device converts signals generated by the computing system into a format suitable for transmission to the second interface device while the second interface device converts signals, received from the first interface device into a format suitable for transmission to the human interface. In alternate aspects thereof, the computing system may be a computer chassis and at least one computing system component housed therein and coupled to the first interface device and the human interface may be a video monitor coupled to the second interface device. The human interface may also include a printer, keyboard or mouse, also coupled to the second interface device.

In another embodiment, the present invention is of a computer comprised of a computing system positioned at a first location and a human interface, which includes a video monitor and at least one I/O device, positioned at a second location remotely located relative to the first location. The computer further includes a first encoder coupled to the computer system, a first decoder coupled to the video monitor and the at least one I/O device and a transmission line which couples the encoder to the decoder. The first encoder receives, from the computing system, a video signal to be transmitted to the video monitor and a non-video signal to be transmitted to the at least one I/O device. The first encoder combines the video and the non-video signals into a combined signal and transmits the combined signal to the first decoder via the transmission line. The first decoder receives the combined signal, separates the video and non-video signals therefrom for respective propagation to the video monitor and the at least one I/O device.

In one aspect thereof, the computer may further include a second encoder coupled to the computing system and the first encoder and a second decoder coupled to the first decoder and the I/O devices. The second encoder receives a first non-video signal to be transmitted to a first I/O device, a second non-video signal to be transmitted to a second I/O device and a third non-video signal to be transmitted to a third I/O device and combines the first, second and third non-video signals into the non-video signal. The second decoder receives the non-video signal from the first decoder and separates the first, second and third non-video signals therefrom for respective propagation to the first, second and third I/O devices. In a further aspect thereof, the first I/O device may be a keyboard, the second I/O device may be a mouse and the third I/O device may be a printer. In another, the first encoder may receive red ("R"), green ("G"), blue ("B"), horizontal synchronization ("HSYNC") and vertical synchronization ("VSYNC") video signals from the computing system, combine the R and HSYNC video signals into a combined signal for transmission to the first decoder, combine the B and VSYNC video signals into another combined signal for transmission to the first decoder and combine the G video signal and the non-video signal into the last combined signal for transmission to the first decoder. The HSYNC and VSYNC video signals may also be used by the second encoder to time the combination of the first, second and third non-video signals into the non-video signal and by the second decoder to time the separation of the non-video signal into the first, second and third non-video signals.

In still another embodiment, the present invention is of a computer which comprises a computing system located at a first location, a human interface located at a second location, remotely located relative to the first location, a first interface device coupled to the computing system, a second interface device coupled to a monitor and an I/O device of the human interface and a 4-wire cable coupling the first and second interface devices. An encoding circuit of the first interface device receives, from the computing system, plural video signals to be transmitted to the video monitor and a non-video output signal to be transmitted to the I/O device. The encoding circuit combines the non-video signal with a selected one of the plural video signals to produce a combined signal and transmits the combined signal over a selected pair of the transmission lines of the 4-wire cable. A decoding circuit of the second interface device receives the combined signal from the first interface device and separates the combined signal into the video signal to be transmitted to the video monitor and the non-video signal to be transmitted to the I/O device.

In one aspect thereof, an encoding circuit of the second interface device receives a non-video input signal from the I/O device and encodes the received signal for output onto a selected pair of the transmission lines for transfer to the first interface device. In another aspect thereof, a decoding circuit of the first interface device receives the non-video I/O input signal from the selected pair of transmission lines and decodes the non-video input signal for transmission to the computing system. In still other aspects thereof, the encoding circuit of the first interface device places the non-video I/O output signal in a selected time interval of the combined signal while the encoding circuit of the second interface device transmits the non-video signal I/O input signal during the same time interval.

In still another embodiment, the present invention is of a computer which comprises a computing system located at a first location, a human interface located at a second location, remotely located relative to the first location, a first interface device coupled to the computing system, a second interface device coupled to a monitor and an I/O device of the human interface and a 4-wire cable coupling the first and second interface devices. An encoding circuit of the first interface device receives, from the computing system, plural video signals to be transmitted to the video monitor and a non-video output signal to be transmitted to the I/O devices. The encoding circuit combines the non-video signal with a selected one of the plural video signals to produce a combined signal and transmits the combined signal over a selected pair of the transmission lines of the 4-wire cable. A decoding circuit of the second interface device receives the combined signal from the first interface device and separates the combined signal into the video signal to be transmitted to the video monitor and the non-video signal to be transmitted to the I/O device.

In one aspect thereof, an encoding circuit of the second interface device receives a non-video input signal from the I/O device and encodes the received signal for output onto a selected pair of the transmission lines for transfer to the first interface device. In another aspect thereof, a decoding circuit of the first interface device receives the non-video I/O input signal from the selected pair of transmission lines and decodes the non-video input signal for transmission to the computing system. In still other aspects thereof, the encoding circuit of the first interface device places the non-video I/O output signal in a selected time interval of the combined signal while the encoding circuit of the second interface device transmits the non-video I/O input signal during the same time interval.

In another embodiment, the present invention is of a method of transmitting signals from a computing system which is positioned at a first location and a human interface which is positioned at a second location remotely located relative to said first location. In accordance with the method, a non-video signal and a selected one of plural video signals generated by the computing system are combined and the combined signal is transmitted to the human interface as the selected video signal. At the human interface, the selected video signal and the non-video signal are separated from the combined signal. The resultant video signal is transmitted to a video monitor forming part of the human interface while the non-video signal is transmitted to an I/O device forming part of the human interface.

In a preferred aspect thereof, the plural video signals include R, G, B, HSYNC and VSYNC signals and, in accordance with the preferred embodiment, the R and HSYNC video signals are combined to produce a first combined video signal, the B and VSYNC video signals are combined to produce a second combined video signal and the G video signal and the non-video signal are combined to produce a combined video/non-video signal. In another aspect thereof, the first combined video signal, the second combined video signal and the combined video/non-video signal are transmitted over a balanced 4-wire transmission system. In still another aspect thereof, the non-video and selected video signals are combined by inserting the non-video signal into a selected portion of the selected video signal which coincides with horizontal and vertical blanking pulse portions thereof.

DETAILED DESCRIPTION OF THE PREFERRED EMBODIMENT

Figure 1:
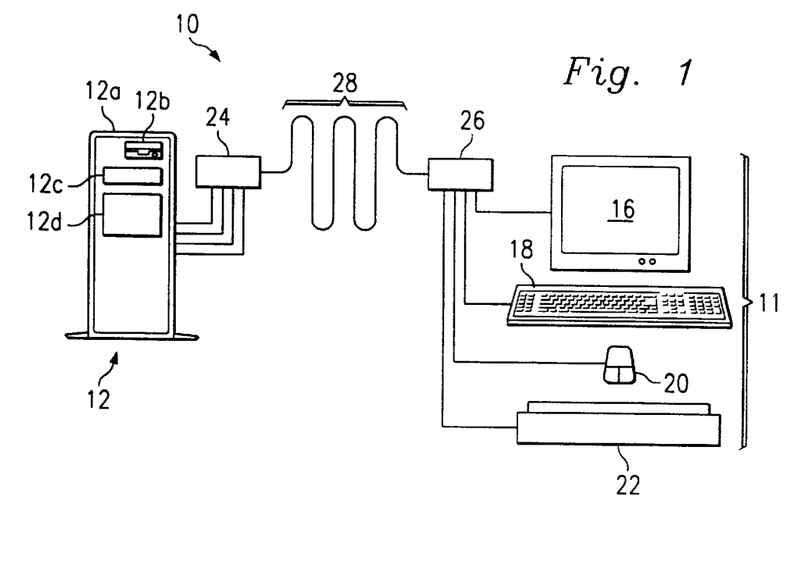
FIG. 1 is a block diagram of a computer system constructed in accordance with the teachings of the present invention.

Referring now to FIG. 1, a computer system 10 constructed in accordance with the teachings of the present invention will now be described in greater detail. As may now be seen, the computer system 10 includes a computing system 12 coupled to a remotely located human interface 14. As illustrated herein, the computing system 12 is simply a computer chassis 12a, sometimes referred to as the "box" in which the motherboard, 12b, disk drive 12c, hard drive 12d, power supply (not shown) and other conventional components, are housed. As illustrated in FIG. 1, the computing system 12 is a mini-tower, a common PC configuration. However, it is specifically contemplated that the computing system 12 may be configured as a desktop model, which typically has more computing power than a mini-tower, a server, which typically has more computing power than a mini-tower, or any other type of commercially available computer.

As shown herein, the human interface 14 is comprised of a monitor 16, a keyboard 18, a mouse 20 and a printer 22, all of which are conventional devices, the operation of which are notoriously well known. The disclosed human interface 14 is given by way of example. Accordingly, it is fully contemplated that other input/output (or "I/O") devices, for example, a joystick, trackball, touchpad or other device may be included as part of the human interface 14. Generally, for inclusion in the human interface 14, an I/O device should require, at a minimum, some type of physical interaction with a human during the operation thereof.

In a conventionally configured computer system, the monitor 16, the keyboard 18, the mouse 20 and the printer 22 would be provided with a cables which terminate in pin connecters of various designs which, when inserted in matching connectors provided on a rear side surface, or "backplane", of the computing system 12, would couple the monitor 16, the keyboard 18, the mouse 20 and the printer 22 to the main system bus (not shown) which couples the various electronic devices which comprises the computing system 12. Unlike the conventionally configured computer system, however, the monitor 16, the keyboard 18, the mouse 20 and the printer 22 are remotely located relative to the computing system 12. To enjoy the benefits of a remotely located human interface 14 as described herein, it is generally contemplated that the computing system 12 and the human interface 14 be located in separate rooms, which typically requires a minimum separation of at least 10 feet. It is specifically contemplated, however, that the computing system 12 and the human interface 14 may be located hundreds, or even thousands, of feet apart. Thus, by the term "remotely located", it is intended to refer to separation distances greater than those possible using conventionally designed cables such as those provided when purchasing a PC. Accordingly, the term "remotely located", as used herein, generally refers to separation distances between 10 and 1,100 feet. However, as it is possible to utilize the disclosed techniques to separate the computing system 12 and the human interface 14 by distances greater than 1,000 feet, it should be clearly understood that the aforementioned upper limit of 1,000 feet is given purely by way of example and should not be construed as a limitation of the scope of the present invention.

To achieve the separation distances contemplated herein, an upstream extension interface 24 is coupled to the computing system 12 and a downstream extension interface 26 is coupled to the human interface 14. Generally, connector cables extending from the monitor 16, the keyboard 18, the mouse 20 and the printer 22 all plug into the downstream extension interface 26 in an manner identical to how those same cables would plug into the backplane of the computing system 12. Similarly, the cables extending from the upstream extension interface 24 identically plug into the backplane of the computing system 12 as would the cables from the monitor 16, the keyboard 18, the mouse 20 and the printer 22 plug thereinto. Finally, coupling the upstream extension interface 24 and the downstream extension interface 26 is a 4-wire cable 28 configured in the manner disclosed in U.S. Pat. application Ser. No. 08/674,626 filed Jul. 3, 1996 entitled "Method and Apparatus for Enabling the Transmission of Multiple Wide Band Width Electrical Signals, assigned to the Assignee of the present application and hereby incorporated by reference as if reproduced in its entirety.

Figure 2:
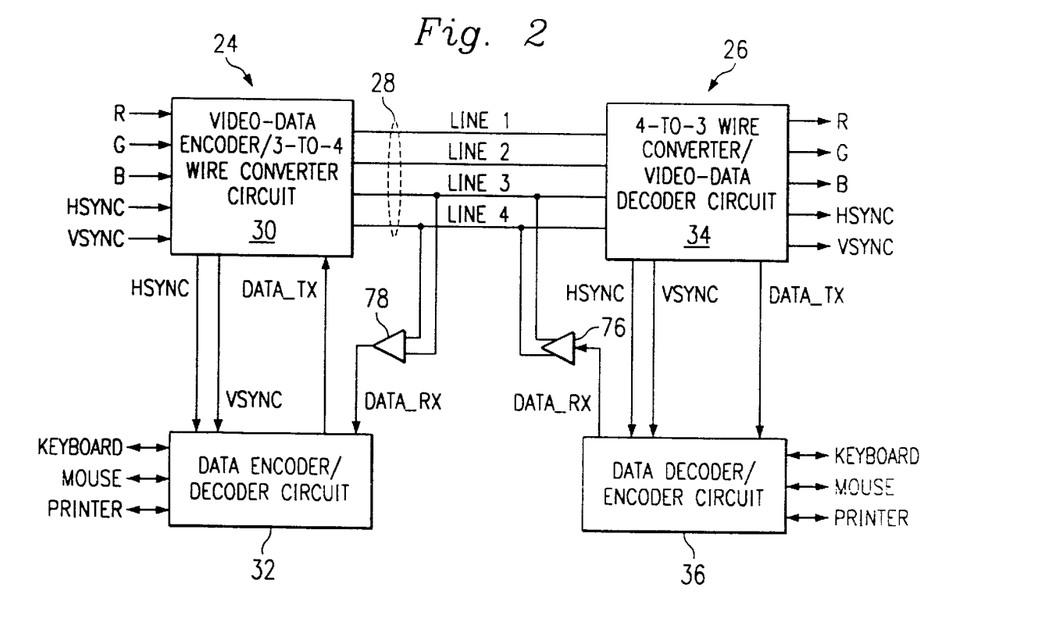
FIG. 2 is an expanded block diagram of upstream extension and downstream extension interfaces of the computer system of FIG. 1.

Referring next to FIG. 2, the upstream and downstream extension interfaces 24 and 26 will now be described in greater detail. As may now be seen, the upstream extension interface 24 is comprised of a video-data encoder/3-to-4 wire converter circuit 30 and a data encoder/decoder circuit 32. Similarly, the downstream extension interface 26 is comprised of a 4-to-3 wire converter/video-data decoder circuit 34 and a data decoder/encoder circuit 36. Broadly speaking, the video-data encoder/3-to-4 wire converter circuit 30 receives video signals output by the computing system 12 for transmission to the monitor 16, specifically, red (or "R"), green (or "G"), blue (or "B"), horizontal synchronization (or "HSYNC") and vertical synchronization (or "VSYNC") signals. The data encoder/decoder circuit 32, on the other hand, receives all signals output by the computing system 12 for transmission to the keyboard 18, the mouse 20 and the printer 22. The data encoder/decoder circuit 32 also receives the HSYNC and VSYNC signals from the video-data encoder/3-to-4 wire converter circuit 30 and, as will be more fully described below, uses the HSYNC and VSYNC signals to encode data received from the computing system 12 into a data signal DATA_TX for transmission to the video-data encoder/3-to-4 wire converter 30.

Figure 3:
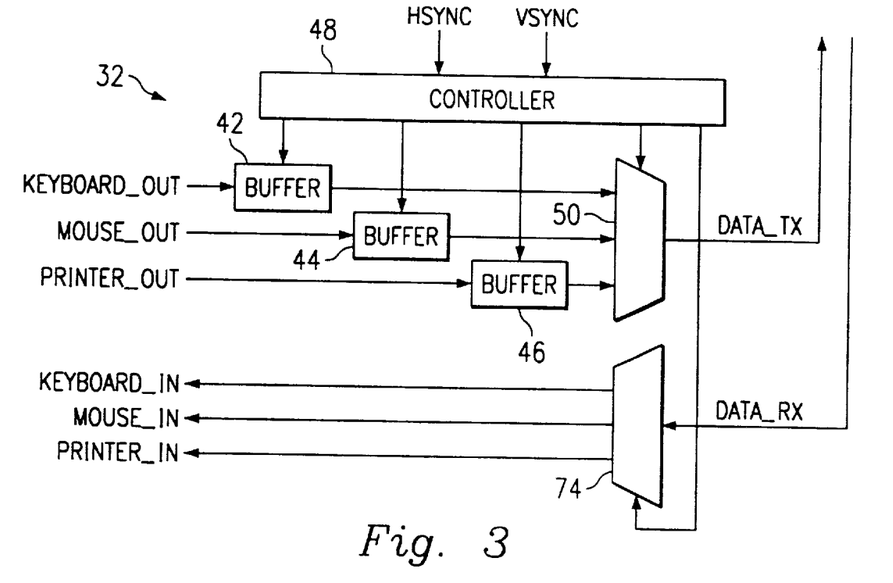
FIG. 3 is an expanded block diagram of a data encoder/decoder circuit of the upstream extension interface of FIG. 2.

Referring next to FIG. 3, operation of the data encoder/decoder circuit 32 in producing the data signal DATA_TX will now be described in greater detail. As is well known in the art, the computing system 12 generates signals to be transmitted to the various I/O devices included as part of the human interface 14. As shown here, the computing system 12 generates KEYBOARD_OUT, MOUSE_OUT and PRINTER_OUT signals for respective propagation to the keyboard 18, the mouse 20 and the printer 22. Each of the output signals KEYBOARD_OUT, MOUSE_OUT and PRINTER_OUT are propagated to a respective buffer 42, 44 and 46 where the received data is held temporarily. The buffers 42, 44 and 46 each include an output tied to a respective input of 3:1 multiplexer 50, the output of which is the DATA_TX signal. The buffers 42, 44 and 46 and the multiplexer 50 are controlled by a controller 48. Specifically, respective control outputs of the controller 48 are tied to a control input of each of the buffers 42, 44 and 46 and to a control input of the multiplexer 50.

The controller 48 times the propagation of the KEYBOARD_OUT, MOUSE_OUT and PRINTER_OUT signals such that the combined signal DATA_TX contains data only during the horizontal and vertical blanking pulses of the video signal being transmitted to the video-date encoder/3-to-4 wire converter circuit 30. To do so, the controller 48 receives the HSYNC and VSYNC signals from the video-data encoder/3-to-4-wire converter circuit 30, The controller 48 counts the blanking pulses contained in the HSYNC and VSYNC signals, and, during each such blanking pulse of the HSYNC and VSYNC signals, enables a selected one of the buffers 42, 44 and 46 and enables the multiplexer 50 such that the data stored in the selected buffer 42, 44 or 46 is propagated to the video-data encoder/3-to-4 wire converter circuit 30 as part of the DATA_TX signal. For example, each time the video signal transmitted to the video-data encoder/3-to-4 wire converter circuit 30 completes a line of video data, the HSYNC signal will contain a blanking pulse. The number of lines required to generate an image that fills the screen of the video monitor 16 will vary, depending on the operating mode of the video monitor 16. In accordance with one such operating mode, 640 lines of video data are required to generate an image. Thus, for this operating mode, the HSYNC signal will blank 640 times. Each blanking pulse is assigned to an output signal destined for a particular I/O device. For example, during horizontal blanking pulses 1–25, the controller 48 propagates data received from the KEYBOARD_OUT line to the video-data encoder/3-to-4 wire converter circuit 30 by enabling the buffer 42 and the multiplexer 50. During horizontal blanking pulses 26–50, the controller 48 propagates data received from the MOUSE_OUT line to the video-data encoder/3-to-4 wire converter circuit 30 by enabling the buffer 44 and the multiplexer 50. Finally, during horizontal blanking pulses 51–640, the controller 48 propagates data received from the PRINTER_OUT line to the video-data encoder/3-to-4 wire converter circuit 30 by enabling the buffer 46 and the multiplexer 50.

It has been discovered that all output signals respectively generated by the computing system 12 for the keyboard 18 and the mouse 20 may be readily contained within the time consumed by 25 blanking pulses. Furthermore, the 590 blanking pulses assigned for the transmission of output signals from the computing system 12 to the printer 22 is more than sufficient for containing all of the output signals generated by the computing system 12 for the printer 22 and that a number of these blanking pulses may be reassigned to support additional I/O devices. Finally, still more I/O devices may be supported by placement of output signals generated by the computing system 12 into the vertical blanking pulses contained in the VSYNC signal which occur each time a screen is scanned.

It is contemplated that the controller 48 performs the disclosed combining of the KEYBOARD_OUT, MOUSE_OUT and PRINTER_OUT signals into a combined output signal encoded such that all of the data occurs during the horizontal and vertical blanking pulses by executing an algorithm, set forth in microcode maintained and executed by the controller 48. It should be noted that some I/O devices may have multiple output lines instead of the single line illustrated in FIG. 3. For such devices, it is contemplated that the data encoder/decoder circuit 32 should be provided with additional circuitry and/or control signals which combines the multiple output lines into a single output signal. For example, the multiple output lines corresponding to a particular I/O device could be propagated to discrete locations within the buffer 42, 44 or 46 assigned to that I/O device. The microcode which enables the data held into the buffer to be propagated along the DATA_TX line could then be modified so that signals from the different output lines corresponding to a single I/O device could be transmitted during different ones of the blanking pulses assigned to that device.

Figure 5:
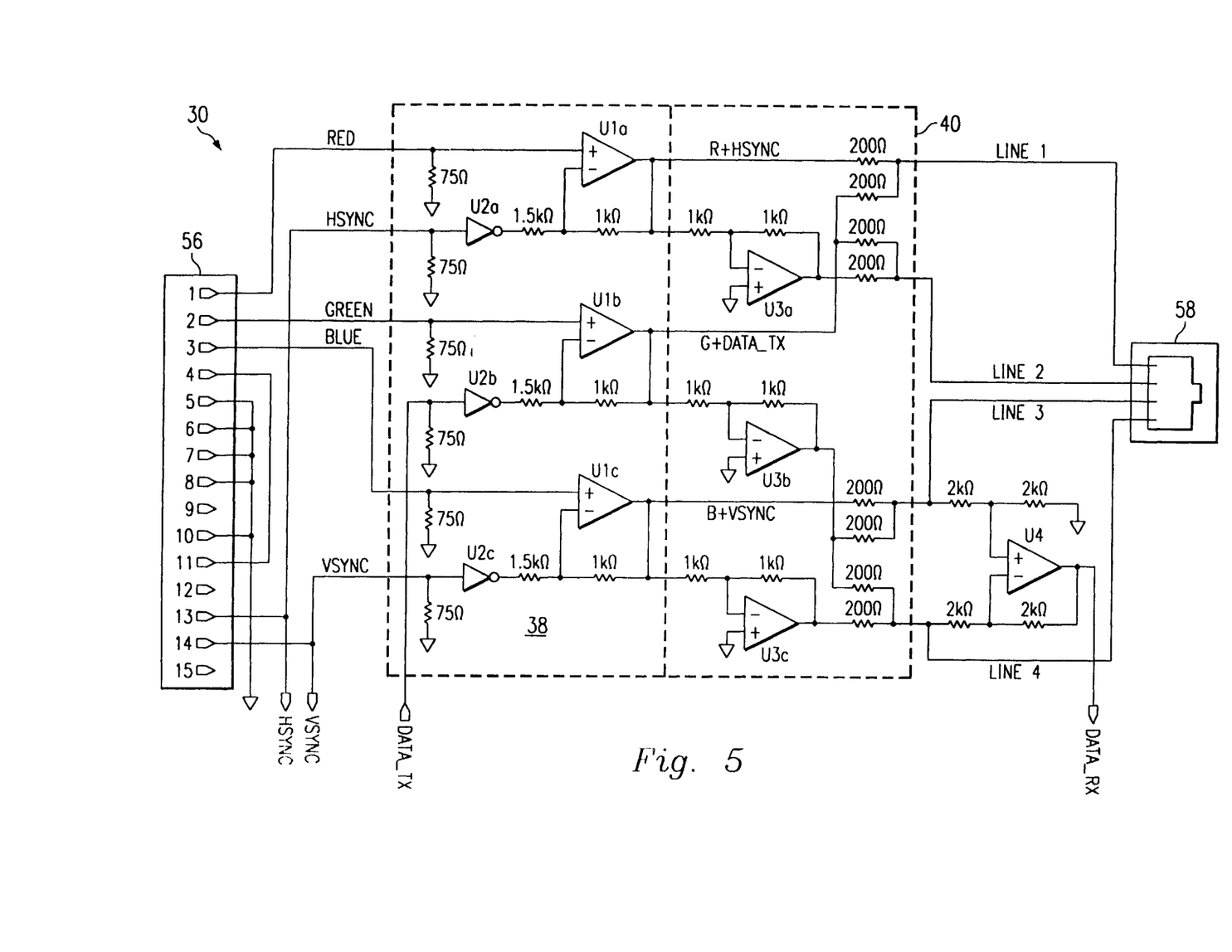
FIG. 5 is a circuit diagram illustrating a video-data encoder/3-to-4 wire converter circuit of the upstream extension interface of FIG. 2.

Referring next to FIG. 5, the video-data encoder/3-to-4 wire converter circuit 30 which receives the DATA_TX signal from the data encoder/decoder circuit 32 is comprised of an encoder circuit 38 coupled to a 3-to-4 wire converter circuit 40. Input to the encoder circuit 38 are the R, G, B, HSYNC, VSYNC and DATA_TX signals. The encoder circuit 38 is similar in construction to the encoder circuit described and illustrated in U.S. Pat. application Ser. No. 08/935,968 filed Sep. 23, 1997 entitled "Video Data Transmission and Display System and Associated Methods for Encoding/Decoding Synchronization Information and Video Data, assigned to the Assignee of the present invention and hereby incorporated by reference as if reproduced in its entirety. Specifically, operational amplifier U1a combines the R and HSYNC signals into a first combined signal R+HSYNC and operational amplifier U1c combines the B and VSYNC signals into a second combined signal B+BSYNC. In Ser. No. 08/935,968, the disclosed system was configured such that the G signal passed through the encoder unchanged. Here, however, the encoder 38 is constructed to include operational amplifier U1b which combines the G and DATA_TX signals into a third combined signal G+DATA_TX. As data received from the computing system 12 and encoded by the data encoder/decoder circuit 32 into the DATA_TX signal is timed such that the data coincides with the blanking period for the G signal, the G and DATA_TX signals may be combined using a circuit identical to the circuits used to combined the R and HSYNC signals and to combine the B and VSYNC signals.

The R+HSYNC, B+VSYNC and G+DATA signals output the encoder 38 are transmitted to the 3-to-4 line converter circuit 40 where the three signals are placed on lines 1–4 of the 4-wire cable 28 for the balanced-mode transmission to the human interface 14. The 3-to-4 wire converter 40 operates as described in co-pending U.S. Pat. application Ser. No. 08/674,626 filed Jul. 3, 1996, entitled "Method and Apparatus for Enabling the Transmission of Multiple Wide Bandwidth Electrical Signals", assigned to the Assignee of the present invention and hereby incorporated by reference as if reproduced in its entirety. Specifically, (R+HSYNC)+ and (G+DATA)+ are placed on line 1, (R+HSYNC)– and (G+DATA)+ are placed on line 2, (B+VSYNC)+ and (G+DATA)– are placed on line 3 and (B+VSYNC)– and (G+DATA)– are placed on line 4 of the 4-wire cable 28 for balanced mode transmission to the 4-to-3 wire converter/video-data decoder circuit 34.

Figure 6:
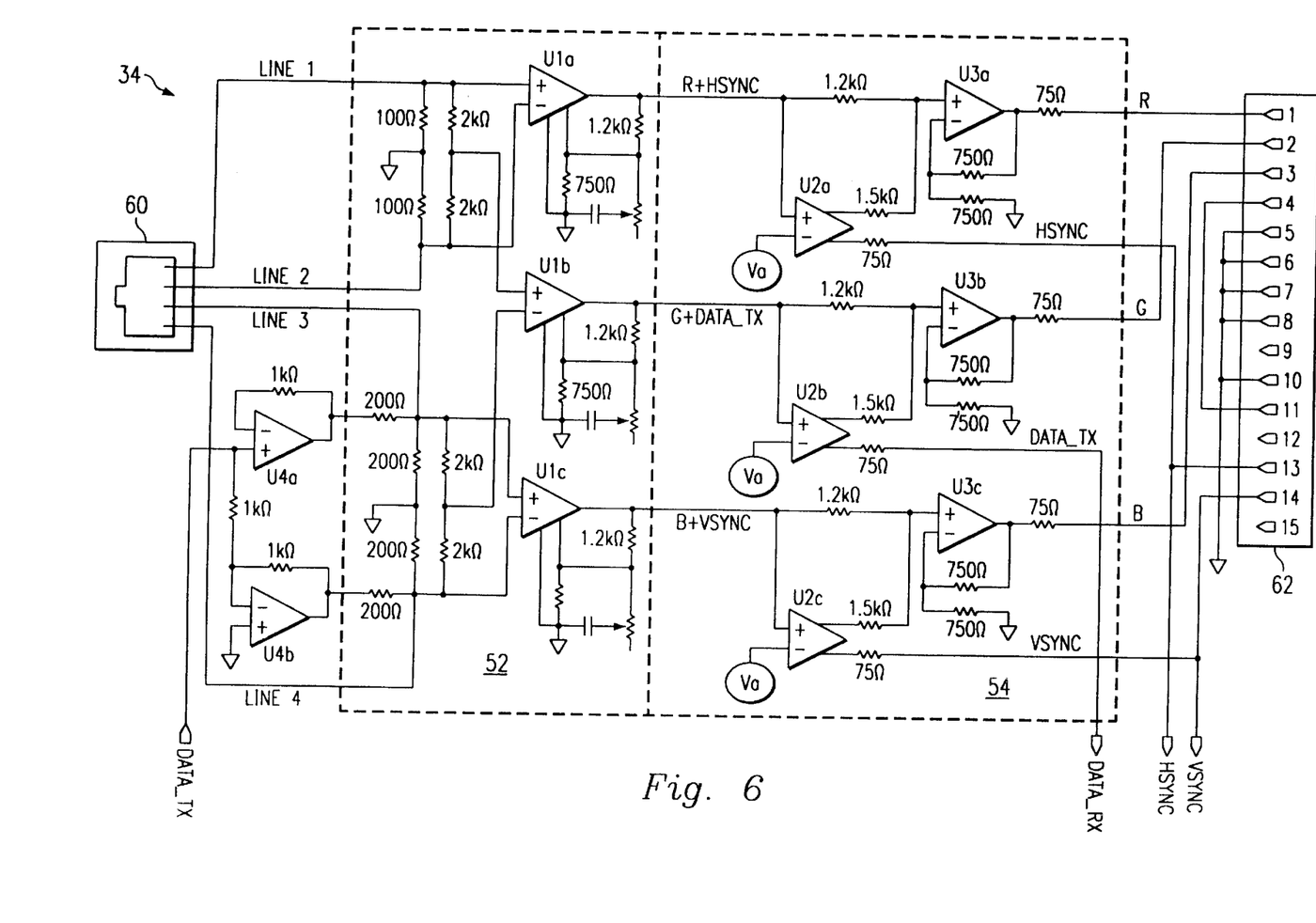
FIG. 6 is a circuit diagram illustrating a video-data decoder/4-to-3 wire converter of the downstream extension interface of FIG. 2.

Referring next to FIG. 6, the 4-to-3 wire converter/video-data decoder circuit 34 which receives the aforementioned video signals from the video-data encoder/3-to-4 wire converter circuit 30 along transmission lines 1–4 is comprised of a 4-to-3 wire converter 52 coupled to a decoder circuit 54. Input to the 4-to-3 wire converter 52 are the video signals transmitted along lines 1–4. In the manner more fully described in co-pending U.S. Pat. application Ser. No. 08/674,626 filed Jul. 3, 1996 and previously incorporated by reference, the output of operational amplifier U1a is the R+HSYNC signal, the output of operational amplifier U1b is the G+DATA_TX signal and the output of operational amplifier U1c is the B+VSYNC signal. The R+HSYNC, G+DATA and B+VSYNC signals are propagated from the 4-to-3 wire converter 52 to the video decoder 54. There, in the manner more fully described co-pending U.S. Pat. application Ser. No. 08/935,968 filed Sep. 23, 1997 and previously incorporated by reference, the output of operational amplifier U3a is the R signal, the output of the operational amplifier U2a is the HSYNC signal, the output of the operational amplifier U3c is the B signal and the output of operational amplifier U2c is the VSYNC signal. In Ser. No. 08/935,968, the disclosed system was configured such that the G signal passed through the decoder unchanged. Here, however, the decoder 54 is constructed to include operational amplifiers U3b and U2b, the outputs of which are the G and DATA_TX signals, respectively.

It is an important aspect of the invention that the encoded video-data signal may be transmitted over the relatively inexpensive 4-wire transmission line used to connect telephones to a telecommunications network such as the public switched telephone network (or "PSTN"). As a result, therefore, the cost of cabling the computer system 10 such that the human interface 14 is located between 10 and 1,000 feet from the computing system 12 is significantly reduced, particularly as the separation distance between the two is increased. Furthermore, the connection requirements for the video-data encoder/3-to-4 wire converter circuit 30 and the 4-to-3 wire converter/video-data decoder circuit 34 are significantly simplified. For example, while the input connector 56 which couples the encoder 38 to cables extending from the computing system 12 is a 15 pin video connector, the output connector 58 which couples the 3-to-4 wire converter 40 to the 4-wire cable 28 is a very inexpensive RJ-11 jack best known for its use as a telephone jack. Similarly, the input connector 60 which couples the 4-to-3 wire converter 52 to the 4-wire cable 28 is another very inexpensive RJ-11 jack while the output connecter 62 which couples the decoder 54 to the video monitor 16 is another 15 pin video connector.

Figure 4:
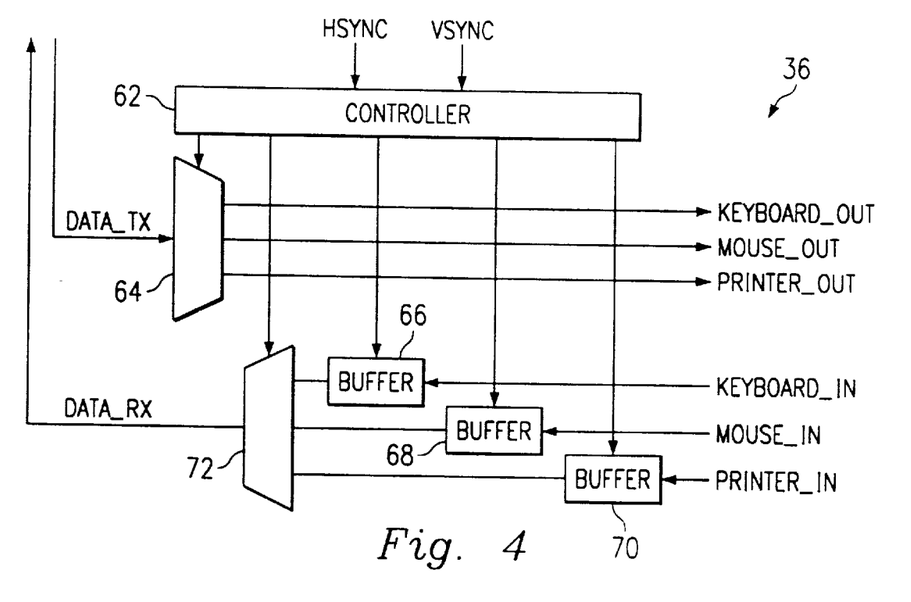
FIG. 4 is an expanded block diagram of a data decoder/encoder circuit of the downstream extension interface of FIG. 2.

Referring next to FIG. 4, the data decoder/encoder circuit 36 will now be described in greater detail. As may now be seen. the data decoder/encoder circuit 36 includes a controller 62 which receives the HSYNC and VSYNC signals from the 4-to-3 wire converter/video-data decoder circuit 34 and a 1:3 demultiplexer 64 having, as its data input, the DATA_TX line, a control input tied to an control output of the controller 62 and first, second and third data outputs—KEYBOARD_OUT, MOUSE_OUT and PRINTER_OUT—which are tied to the keyboard 18, the mouse 20 and the printer 22, respectively. The controller 62 separates keyboard, mouse and printer data from the combined DATA_TX signal by instructing the demultiplexer 64 as to when the input signal should be propagated as the KEYBOARD_OUT, MOUSE_OUT and PRINTER_OUT signals, respectively. To do so, the controller 62 receives the HSYNC and VSYNC signals from the 4-to-3 wire converter/video-data decoder circuit 34. The controller 62 counts the blanking pulses contained in the HSYNC and VSYNC signals, and, during each such blanking pulse of the HSYNC and VSYNC signals, instructs the demultiplexer 64 to propagate that portion of the DATA_TX signal received by the demultiplexer 64 during that blanking pulse to be output from the demultiplexer on a selected one of the KEYBOARD_OUT, MOUSE_OUT or PRINTER_OUT lines. For example, during horizontal blanking pulses 1–25, the controller 64 may propagate data received from the DATA_TX line on the KEYBOARD_OUT line. During horizontal blanking pulses 26–50, the controller 64 may propagate data received from the DATA_TX line on the MOUSE_OUT line. Finally, during horizontal blanking pulses 51–640, the controller 64 may propagate data received from the DATA_TX line on the PRINTER_OUT line. As before, it is contemplated that the controller 62 performs the disclosed separation of the KEYBOARD_OUT, MOUSE_OUT and PRINTER_OUT signals from the combined DATA_TX signal by executing an algorithm, set forth in microcode maintained and executed by the controller 62.

Heretofore, only the transmission of signals from the computing system 12 to the keyboard 18, the mouse 20 and the printer 22 which collectively are the I/O devices forming part of the human interface 14 as been described. As it is typically preferred that computer systems are configured for bi-directional exchanges between the computing system 12 and I/O devices such as the keyboard, mouse and printer and the I/O devices, it is desired that the computer system 10 disclosed herein enable the transmission of signals from the keyboard 18, the mouse 20 and the printer 22 to the computing system 12. Such a further enablement of the invention shall now be described in greater detail, again by referring to FIGS. 2, 3 and 4.

As may now be seen, signals output by the keyboard 18, the mouse 20 and the printer 22 are respectively transmitted along the KEYBOARD_IN, MOUSE_IN and PRINTER_IN lines to a respective buffer 66, 68 and 70. Each of the buffers 66, 68 and 70 have a control input tied to a respective control output of the controller 62 and an output tied to a corresponding input of 3:1 multiplexer 72. Similarly, the multiplexer 72 has a control input tied to a control output of the controller 62. As the operation of the data decoder/encoder circuit 36 in combining the KEYBOARD_IN, MOUSE_IN and PRINTER_IN signals into a combined data signal DATA_RX is identical to the operation of the data encoder/decoder circuit 32 in combining the KEYBOARD_OUT, MOUSE_OUT and PRINTER_OUT signals into the combined data signal DATA_TX, further description of the data decoder/encoder circuit 36 in generating the return path signal, hereafter referred to as the DATA_RX signal, is not deemed necessary. Similarly, as the data encoder/decoder circuit 32 includes a 1:3 demultiplexer 74 having an input which receives the DATA_RX signal, a control input tied to a control output of the controller 48 and first, second and third outputs on which KEYBOARD_IN, MOUSE_IN and PRINTER_IN signals are transmitted to the computing system and the data encoder/decoder circuit 32 separates the DATA_RX signal into the KEYBOARD_IN, MOUSE_IN and PRINTER_IN signals in a manner identical to the operation of the data decoder/encoder circuit 36 in separating the KEYBOARD_OUT, MOUSE_OUT and PRINTER_OUT signals from the DATA_TX signal, further description of the data encoder/decoder circuit 32 in generating the KEYBOARD_IN, MOUSE_IN, and PRINTER_IN signals is also not deemed necessary.

Rather than directing the DATA_RX signal to the video-data decoder/4-to-3 wire converter, the DATA_RX signal is directed to a transmitter 76 which splits the DATA_RX line into two identical signals and directly injects the signal on each of lines 3 and 4 of the 4-wire cable 28 in differential mode. As the DATA_RX signal can only go high during the horizontal and/or vertical blanking pulses, data may be bi-directionally transferred between the computing system 12 and the I/O devices (the keyboard 18, the mouse 20 and the printer 22) without interfering with the video signal being transferred from the computing system 12 to the video monitor 16. Furthermore, the microcode contained in the controllers 48 and 62 may be readily modified to enable bi-directional transmissions. For example, other blanking pulses may be assigned to the KEYBOARD_IN, MOUSE_IN and PRINTER_IN signals. Alternatively, the blanking pulses may be subdivided into "in" and "out" portions. For example, horizontal blanking pulses 1–13 may be assigned to KEYBOARD_OUT while horizontal blanking pulses 14–25 are assigned to KEYBOARD_IN. By enabling the controllers 48 and 62 to distinguish between signals going from the I/O devices to the computing system 12 and signals going from the computing system 12 to the I/O devices, the controllers 48 and 62 can respectively instruct the multiplexers 74 and 64 to ignore signals received from the DATA_RX and DATA_TX lines if such data was received at times indicating that the data is intended to travel in the opposite direction.

As previously stated, the transmitter 76 places DATA_RX on both lines 3 and 4 of the 4-wire cable 28. Lines 3 and 4 are further coupled to inputs of receiver 78 which provides, as its output, the signal DATA_RX. By placing DATA_RX on both lines, noise on the lines may be detected as any differential between the signals respectively received on the lines 3 and 4, thereby providing noise immunization, as well as reduced EMI radiation levels, for transmissions along the lines 3 and 4.

Finally, referring again to FIG. 6, the outputs of the operational amplifiers U1a, U1b and U1c have ganged controls which adjust the frequency response of the system. These controls compensate for the DC and high frequency losses in the 4-wire cable 28 used to connect the upstream extension interface 24 with the downstream extension interface 26. In addition, these controls may be used enhance the image to the user's taste by providing a "tone" control for video in which the high frequency video energy may be boosted to restore edges and definition to the display. As this equalization can make edges easier for tired eyes to detect, and thus recognize, it is a user-adjustable control.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computer, comprising:

a computing system located at a first location;

a human interface located at a second location, said second location remotely located relative to said first location, said human interface comprised of a video monitor and first, second and third I/O devices;

a first encoder coupled to said computing system;

a second encoder, coupled to said computing system and said first encoder, said second encoder receiving a first non-video signal to be transmitted to said first I/O device, a second non-video signal to be transmitted to said second I/O device and a third non-video signal to be transmitted to said third I/O device and combining said first, second and third non-video signals into a non-video signal received by said first encoder;

said first encoder receiving a video signal to be transmitted to said video monitor and receiving the non-video signal from the second decoder and combining said video and said non-video signals into a first combined signal;

a first decoder coupled to said video monitor and said at least one I/O device;

said first decoder receiving said first combined signal from said first encoder and separating said video and non-video signals therefrom for respective propagation to said video monitor and said at least one I/O device;

a second decoder, coupled to said first decoder and said first, second and third I/O devices, said second decoder receiving said non-video signal from said first decoder; separating said first, second and third non-video signals therefrom and transmitting said first, second and third non-video signals to said first, second and third I/O devices, respectively; and a transmission line coupling said first encoder and said first decoder.

2. A computer according to claim 1 wherein said first I/O device is a keyboard, said second I/O device is a mouse and said third I/O device is a printer.

3. A computer according to claim 1 wherein said first encoder receives R, G, B, HSYNC and VSYNC video signals from said computing system and combines said R and HSYNC video signals into a second combined signal to be transmitted to said first decoder, combines said B and VSYNC video signals into a third combined signal to be transmitted to said first decoder and combines said G video signal and said non-video signal into said first combined signal.

4. A computer according to claim 3 wherein said first encoder transmits said HSYNC and VSYNC video signals to said second encoder, said second encoder using said HSYNC and VSYNC video signals to time combining said first, second and third non-video signals into said non-video signal.

5. A computer according to claim 4 wherein said first decoder transmits said HSYNC and VSYNC video signals to said second decoder, said second decoder using said HSYNC and VSYNC video signals to time separating said non-video signal into said first, second and third non-video signals.

6. A computer, comprising:

a computing system located at a first location;

a human interface located at a second location, said second location remotely located relative to said first location, said human interface comprised of a video monitor and an input/output ("I/O") device;

a first interface device coupled to said computing system, said first interface device including an encoding circuit;

a second interface device coupled to said monitor and said I/O device, said second interface device including a decoding circuit; and a 4-wire cable coupling said first and second interface devices, said 4-wire cable being comprised of first, second, third and fourth transmission lines;

said encoding circuit receiving, from said computing system, plural video signals to be transmitted to said video monitor and a non-video output signal to be transmitted to said I/O device, combining said non-video signal with a selected one of said plural video signals to produce a combined signal and transmitting said combined signal over a selected pair of said first, second, third and fourth transmission lines of said 4-wire cable;

said decoding circuit receiving said combined signal from said first interface device and separating said combined signal into said video signal for transmission to said video monitor and said non-video signal for transmission to said I/O device.

7. A computer according to claim 6 wherein said second interface device further comprises:

an encoding circuit having an input coupled to said I/O device and an output coupled to said selected pair of said transmission lines;

said encoding circuit encoding a non-video input signal, received from said I/O device, for transmission to said computing system over said selected pair of transmission lines.

8. A computer according to claim 7 wherein said first interface device further comprises:

a decoding circuit having first and second inputs coupled to respective ones of said selected pair of said transmission lines and an output coupled to said computing system;

said decoding circuit decoding said non-video input signal received from said encoding circuit of said second interface device for transmission to said computing system.

9. A computer according to claim 8 wherein said encoding circuit of said first interface device places said non-video I/O output signal in a selected time interval of said combined signal.

10. A computer according to claim 9 wherein said encoding circuit of said second interface device transmits said non-video I/O input signal during said selected time interval.

11. A computer, comprising:

a computing system located at a first location;

a human interface located at a second location, said second location remotely located relative to said first location, said human interface comprised of a video monitor and at least two I/O devices;

a first encoder coupled to said computing system;

a second encoder, coupled to said computing system and said first encoder, said second encoder receiving at least two non-video signals to be transmitted respectively to said at least two I/O devices and combining said at least two non-video signals into a non-video signal received by said first encoder;

said first encoder receiving a video signal to be transmitted to said video monitor and receiving the non-video signal from the second decoder and combining said video and said non-video signals into a first combined signal;

a first decoder coupled to said video monitor;

said first decoder receiving said first combined signal from said first encoder and separating said video and non-video signals therefrom for respective propagation to said video monitor and said at least two I/O devices;

a second decoder, coupled to said first decoder and said at least two I/O devices, said second decoder receiving said non-video signal from said first decoder, separating said at least two non-video signals respectively therefrom and transmitting said at least two non-video signals to said at least two I/O devices, respectively; and a transmission line coupling said first encoder and said first decoder.

12. A computer according to claim 11 wherein said at least two I/O devices comprise a keyboard and a mouse.

13. A computer according to claim 11 wherein said at least two I/O devices comprise a keyboard.

14. A computer according to claim 11 wherein said at least two I/O devices comprise a mouse.

15. A computer according to claim 11 wherein said first encoder receives R, G, B, HSYNC and VSYNC video signals from said computing system and combines said R and HSYNC video signals into a second combined signal to be transmitted to said first decoder, combines said B and VSYNC video signals into a third combined signal to be transmitted to said first decoder and combines said G video signal and said non-video signal into said first combined signal.

16. A computer according to claim 15 wherein said first encoder transmits said HSYNC and VSYNC video signals to said second encoder, said second encoder using said HSYNC and VSYNC video signals to time combining said at least two non-video signals into said non-video signal.

17. A computer according to claim 16 wherein said first decoder transmits said HSYNC and VSYNC video signals to said second decoder, said second decoder using said HSYNC and VSYNC video signals to time separating said non-video signal into said at least two non-video signals, respectively.

* * * * *